United States Patent [19]

Barret et al.

[11] Patent Number: 4,653,379

[45] Date of Patent: Mar. 31, 1987

[54] FILAMENT DEPLOYMENT MEANS

[75] Inventors: Louis Barret, Grenoble; André Eybert-Berard, Sassenage, both of France

[73] Assignee: Commissariat a l'Energie Atomique, Paris, France

[21] Appl. No.: 627,785

[22] Filed: Jul. 5, 1984

[30] Foreign Application Priority Data

Jul. 6, 1983 [FR] France ............................. 83 11281

[51] Int. Cl.⁴ ............................................. F42B 13/56
[52] U.S. Cl. .................................... 89/1.34; 89/1.816; 102/504
[58] Field of Search ................ 89/1.816, 1.817, 1.819, 89/1.34; 102/504, 505

[56] References Cited

U.S. PATENT DOCUMENTS

| | | | |
|---|---|---|---|
| 2,805,622 | 9/1957 | Cammin-Christy | 102/504 |
| 3,575,083 | 4/1971 | Hudick et al. | 89/1.34 |
| 3,646,887 | 3/1972 | Stine | 102/504 X |
| 3,769,876 | 11/1973 | Hess et al. | 89/1.817 X |
| 3,789,729 | 2/1974 | Aupy | 89/1.819 X |
| 3,807,275 | 4/1974 | Betts | 89/1.816 X |
| 3,910,189 | 10/1975 | Whidden et al. | 102/504 X |
| 3,926,386 | 12/1975 | Stahmann et al. | 242/118 |
| 4,470,336 | 9/1984 | Swann et al. | 89/1.819 X |

FOREIGN PATENT DOCUMENTS

| | | | |
|---|---|---|---|
| 1293802 | 4/1962 | France | 102/348 |
| 1470434 | 1/1967 | France. | |
| 271403 | 10/1950 | Switzerland. | |
| 2009371 | 6/1979 | United Kingdom. | |
| 2061471 | 5/1981 | United Kingdom. | |

Primary Examiner—David H. Brown
Attorney, Agent, or Firm—James E. Nilles

[57] ABSTRACT

System for artificially triggering lightning flashes. This system comprises a rocket, provided with fins, launched from a launcher and which trails behind it a thin wire made from a conductive material, which is either electrically connected to the ground, or is connected to a second wire made from an insulating material, which is in turn attached to the ground, as well as a pay-out reel. The pay-out reel is constituted by a reel body in the form of a cylindrical tube onto which the wire is wound with a limited winding thickness, mounted at the lower end, centered on the central axis of the rocket, the reel having a diameter larger than that of the rocket body and smaller than the apparent diameter of the guidance fins. The launcher is constituted by a plastic tube.

2 Claims, 4 Drawing Figures

FILAMENT DEPLOYMENT MEANS

BACKGROUND OF THE INVENTION

The present invention relates to a system for the artificial triggering of lightning flashes. It applies to the triggering of lightning flashes to cause them to follow a preferred path in space.

There are two fundamental principles for artificially triggering lightning flashes.

According to the first principle, a small hail stopping-type rocket is launched into a storm cloud and trails behind it a thin wire made from a conductive material and electrically connected to the ground. This leads to a lightning flash, whose ground impact point is fixed beforehand.

According to the second principle, instead of guiding the lightning flash to the ground by means of a metallic wire, it is given the free choice of its path over the last few hundred meters before striking the ground. This is brought about by using a mixed wire, which is firstly insulating and then conductive. This process is particularly interesting for studying impact mechanisms and for testing protective equipment, such as lightning arresters, lightning conductors, shielding, etc.

For both these principles, the lightning flash triggering success rate is closely linked with the human and technical intervention speeds.

The first is difficult to improve, whereas the second is dependent on the construction of the triggering system.

In the present state of the art, the most limiting element is the small diameter pay-out reel, which does not make it possible to unwind the wire with the same speed as that of the rocket. When using a commercial rocket, e.g. the Ruggiéri 614, it is necessary to modify the same for the purpose of reducing its speed. This is very difficult, because it involves machining the black powder power plant. In addition, the metallic rocket launcher is very heavy and complicated, which also requires a damping or shock absorbing system for regularizing the unwinding of the roll of wire.

In order to unwind a mixed wire, use has hitherto been made of a pay-out reel pulled by the rocket. This system does not make it possible to unwind a mixed wire (e.g. Kevlar plus copper) at speeds exceeding 100 m/sec. The thus slowed-down rocket increases the risk of failure.

For both these procedures, an explosive is located in the rocket nose cone and on exploding at the end of the trajectory shatters the rocket into small pieces. This explosive unit which is necessary for the dispersion of the fragments, has disadvantages from the safety standpoint with respect to the storage, transportation, handling of rockets, etc.

SUMMARY OF THE INVENTION

The object of the invention is to obviate these disadvantages and more particularly to propose a system for artificially triggering lightning flashes, which is more efficient, is easier to manufacture, is adaptable to the use of conductive wires and mixed wires of a smaller and lighter nature.

The present invention therefore relates to a system for artificially triggering lightning flashes, comprising a rocket having fins, launched from a launcher and which drags behind it a thin wire made from a conductive material, which is either connected electrically to the ground or is connected to a second wire mode from an insulating material which is attached to the ground, and a wire pay-out reel, wherein the wire pay-out reel comprises a reel body in the form of a cylindrical tube onto which the wire is wound with a limited winding thickness, mounted at the lower end, centered on the central axis of the rocket, the reel having a diameter exceeding that of the rocket body and smaller than the apparent diameter of the guidance fins.

According to another feature of the invention, the reel body is mounted on the rocket by embedding in the guidance fins, followed by bonding.

According to another feature, the launcher is a plastic tube.

According to another feature of the invention, the rocket comprises a nose cone equipped with guidance means making it possible to guide the rocket in the launcher.

According to another feature of the invention, several tube-like launchers are grouped in star-like manner on a support.

According to another feature of the invention, the rocket nose cone contains a parachute connected to an ejection system, which functions as soon as combustion is at an end.

BRIEF DESCRIPTION OF THE DRAWINGS

The invention is described in greater detail hereinafter relative to non-limiting embodiments and with reference to the attached drawings, wherein show.

DETAILED DESCRIPTION OF THE PREFERRED EMBODIMENTS

Figure 1:
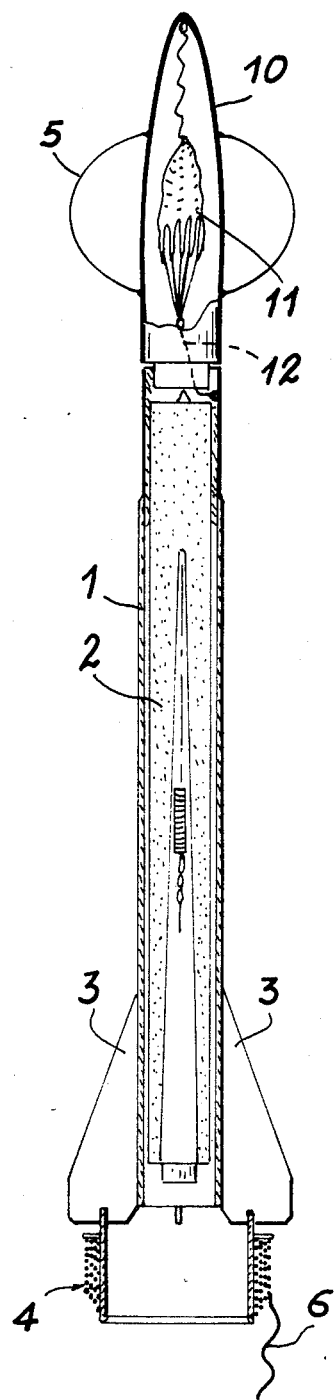
FIG. 1, diagrammatically, a Ruggiéri 614 rocket, adapted to the system according to the invention, in section along the central axis.

With reference to FIG. 1, the rocket adapted to the system for artificially triggering lightning flashes according to the invention, more particularly comprises a tubular power plant 1 which is open at a lower or rear end thereof to provide a gas discharge outlet and contains black powder 2, and which is provided at its lower end with stabilizing fins 3. As is well known combustion of the black powder results in the expulsion of combustion gases from the discharge outlet, and the reaction to this discharge propels the rocket forward and upward. A reel body 4, preferably made from plastic and especially PVC, is mounted on the lower end, centered on the central axis of the rocket. The reel diameter exceeds that of the rocket body and is less than the apparent diameter of the guidance fins. Because the diameter of the reel is larger than that of the tubular rocket body, atmospheric air flows through the reel, along with and in surrounding relation to the flow of discharged propulsion gases to maintain the temperature of the reel substantially below that of the discharge gases at the outlet from the body.

The reel body is fixed by embedding in the guidance fins and then by bonding with Cyanolit. The simplified installation of the reel on the rocket makes it possible to choose and install the reel in the vicinity of the rocket launch point.

In the case where the rocket is a Ruggiéri 614 rocket, the reel dimensions are body diameter 120 mm, body length 110 mm.

For a use of the system according to the first principle referred to hereinbefore, a Kevlar-sheathed, 0.2 mm diameter copper wire 6 is wound onto the reel and together there is a diameter of 0.4 mm. The wire length is approximately 700 m.

For a use according to the second principle, the insulating part of the Kevlar wire has a diameter of 0.4 mm and a length between 50 and 300 mm, whilst the conductive part is a copper wire of approximate length 400 mm and a diameter of 0.2 mm and is Kevlar-sheathed. The assembly has a diameter of 0.4 mm.

The conductive or mixed wires have an ultimate or breaking strength of approximately 18 daN. Because the reel itself is kept well below the temperature of the discharging combustion gases by the above-described flow of air through the reel, any filament wound on the reel will obviously be protected by that same air flow from damage by the heat of the discharging gases.

The outlet of each reel is mechanically fixed by a safety level which breaks when the rocket is launched.

Figure 2:
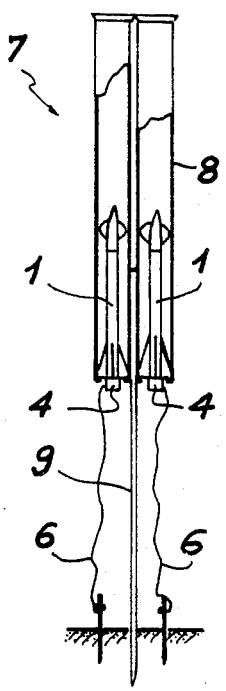
FIG. 2, diagrammatically, the rocket launcher, constituted by several tubes mounted on a support.

The completely insulating wire, as used in the case of the second principle, is unwound first. It is therefore wound over the copper wire and its free end is attached to the ground. The insulating wire is fibreglass-sheathed over the first five meters which are unwound, in order to prevent damage by the impact of the heat occurring during the launch of the rocket from launcher 7. The launcher essentially comprises a plastic and preferably PVC tube 8, the material being readily commercially available. Three or six launchers in star-like configuration can be installed on the same support 9. FIG. 2 shows such a support with several plastic tube launchers.

When using a Ruggiéri 614 rocket, the tube dimensions are internal diameter 238 mm and external diameter 250 mm, with a length of 2.5 m.

In order that the rocket is guided within the tube during launch, a guidance system 5 is installed on the nose cone 10 that closes the body tube 1 at its front or upper end. The guidance system comprises 3 or 4 spring steel "moustaches", the length thereof being such that once placed on the surface of nose cone 10, their apparent diameter is equal to the apparent diameter of the rocket guidance fins 3. The explosive in the Ruggiéri rocket nose cone 10 is removed.

Thus, safety during storage, transportation, etc are increased. Moreover, the speed is increased by reducing the weight. The available volume within the nose cone is increased to 500 cm$^3$, which enables telemetry experiments to be carried out. Instead of shattering the rocket into small pieces at the end of the trajectory, a parachute 11 is provided which permits a slow descent of the complete assembly constituted by nose cone 10, power plant 1 and reel body 4. This eliminates any danger on the ground and the reel body and parachute can be reused after recovery.

The parachute is housed in the rocket nose cone and connected to an ejection system 12, which operates at the end of combustion. Its straps are connected to the rocket body.

Figure 3:
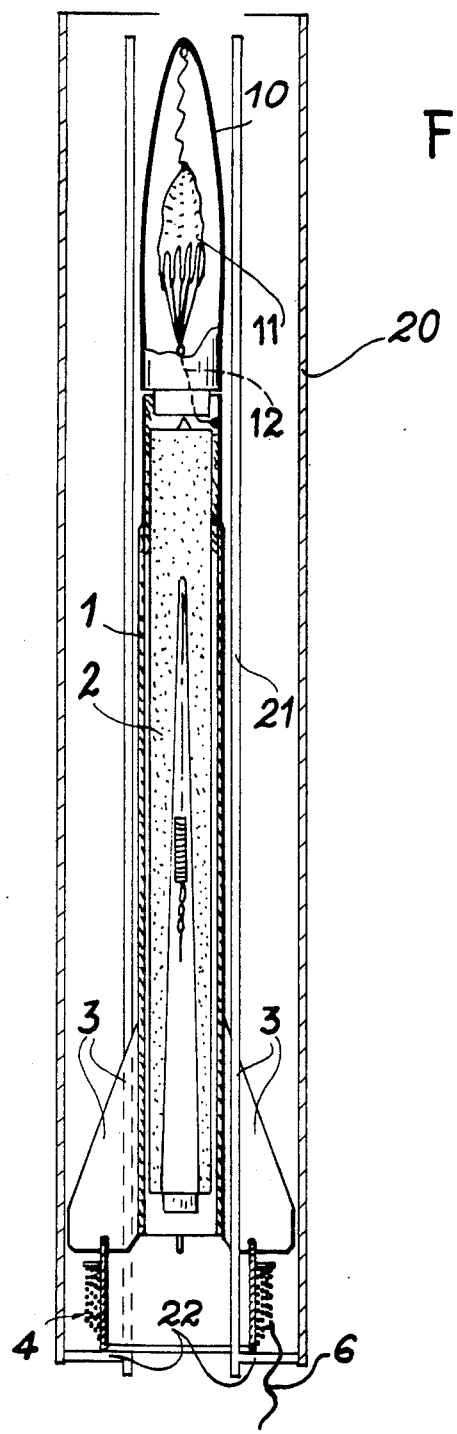
FIG. 3 a diagrammatic view of a special embodiment of the launcher.
Figure 4:
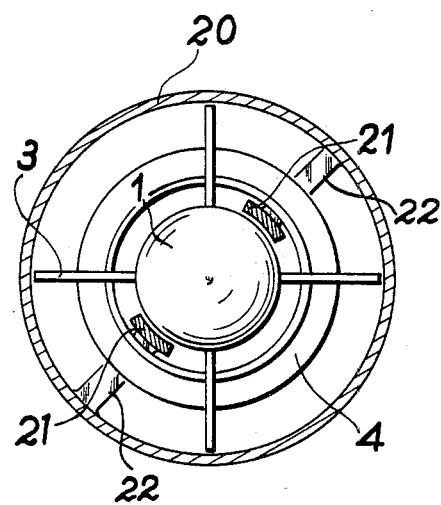
FIG. 4 is a cross-section through FIG. 3, taken on a plane just above the nose of the rocket.

FIGS. 3 and 4 show a special embodiment of the rocket launcher. Launcher 20 is constituted by an e.g. plastic tube, whose length is less than that of the tubes 8 shown in FIG. 2. This length slightly exceeds the length of the rocket provided with its pay-out reel 4. Ramp 20 is internally provided with e.g. metallic slides 21, which guide the rocket in the tube in order to maintain it in its launch trajectory. The guidance system 5 (FIG. 1) is then eliminated. The slides 21 surround the rocket parallel to the axis of the tube and essentially extend from the top of the rocket to a level slightly below the bottom of the pay-out reel, whilst traversing the latter. For example, use is made of two slides 21 which are symmetrical to one another with respect to tube 20. Each slide 21 is fixed to tube 20 by a bar 22, which connects the lower end of said slide to the tube and which is e.g. perpendicular to the axis thereof, the pay-out reel 4 resting on bars 22.

What is claimed is:

1. Filament deployment means carried by a rocket having an elongated body which is concentric to an axis and which has a first diameter at a rear end thereof, a discharge outlet in said rear end of the body from which gases issue rearwardly when the rocket is in flight, and fins on the rear end portion of the body projecting substantially radially therefrom to a circle which is concentric to said axis and which has a second diameter substantially larger than said first diameter, said filament deployment means providing for deployment of a filament such as a fine wire which can have one end secured to the ground and which is carried by the rocket to be paid out from it as the rocket progresses in flight, said deployment means comprising:

a substantially cylindrical and tubular reel member upon the exterior of which the filament is coiled, said reel member having front and rear ends and
(1) having a diameter which is larger than said first diameter but smaller than said second diameter and
(2) being mounted concentrically to said axis with its front end portion secured to the rear end portions of said fins and with its rear end spaced a substantial distance behind the rear end of the body resulting in a plurality of arcuate openings about the circumference of said body, each said opening being bounded by two of said fins, a portion of said body and a portion of said reel member so that air enters said openings and passes freely through said reel member thereby inherently cooling thwe reel member and the filament while the filament uncoils from the reel member without interference from any part of the rocket.

2. The filament deployment means of claim 1 further characterized in that said reel member is secured to said fins by having rear end portions of the fins embedded in and bonded to its front end portion.

* * * * *